July 18, 1950 L. S. MARANZ 2,515,722
FREEZER
Filed May 18, 1949
Fig. 1.
Fig. 2.
Fig. 3.
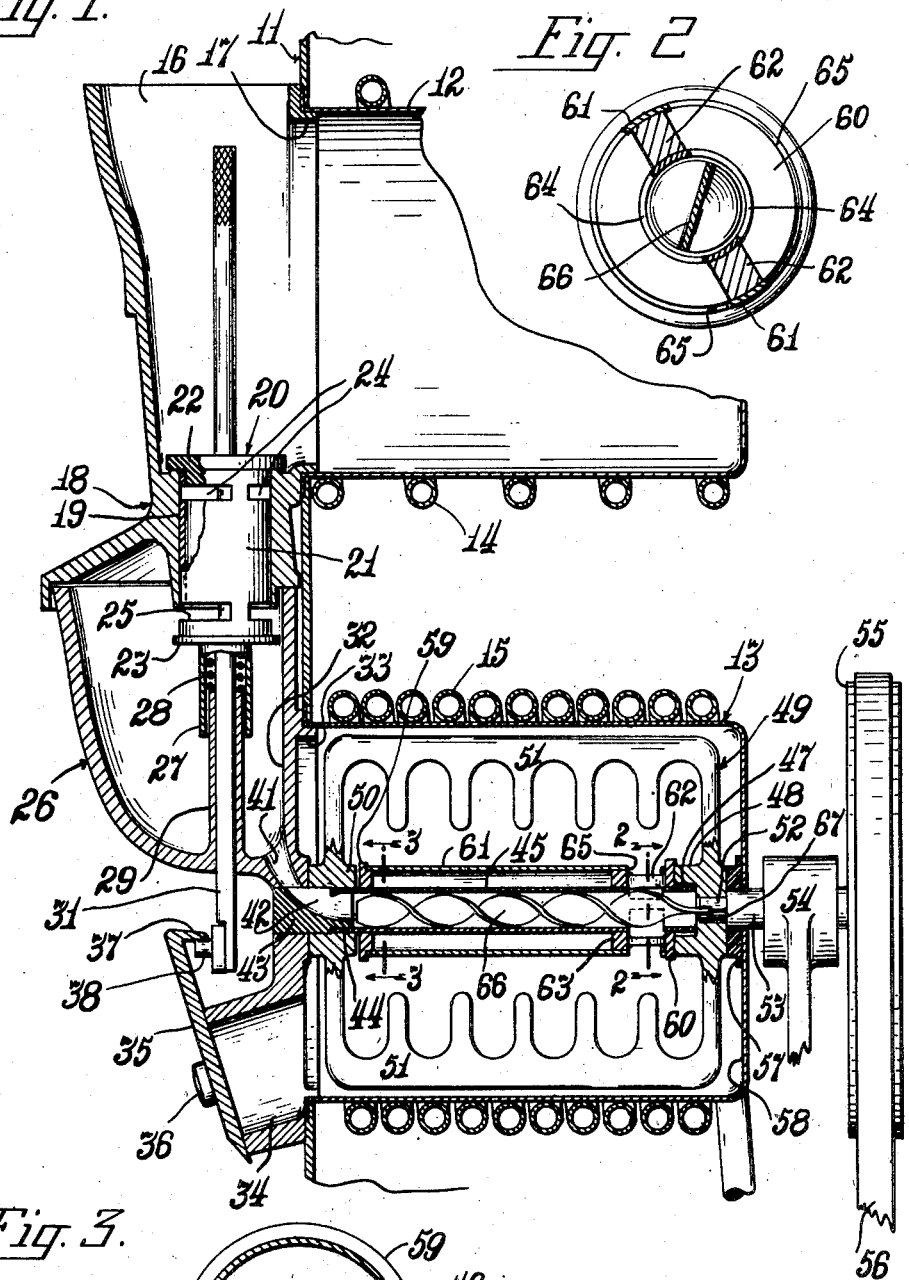
INVENTOR.
LEO S. MARANZ
BY
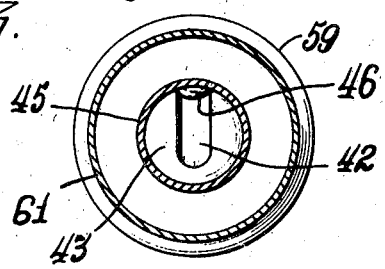
ATTORNEY Patented July 18, 1950

2,515,722

UNITED STATES PATENT OFFICE 2,515,722

FREEZER

Leo S. Maranz, Chicago, Ill., assignor to Freeze King Corporation, Chicago, Ill., a corporation of Illinois Application May 18, 1949, Serial No. 93,984

11 Claims. (Cl. 62—114)

The invention relates to improvements in freezers and more particularly to a novel feed mechanism for continuous flow freezers of the kind used to dispense frozen custards, soft ice cream, frosted malts, etc.

The continuous flow freezer embodying the present invention is of a type in which a continuous supply of substantially liquid custards, malts or ice cream, etc., commonly referred to as "mix," is delivered to a refrigerator compartment for preliminary chilling and then conveyed through a measuring valve into a freezing chamber from which it is drawn off through a gate controlled discharge in desired quantities. Present construction of this type of machine causes the "mix" to be delivered at the front or discharge end of the freezing chamber which is equipped with a beater operable therein to prevent solid freezing of the "mix." Often the newly admitted "mix" moves directly toward the discharge without having remained in the freezing chamber sufficiently long to be properly aerated and chilled. This results in the discharge of "mix" far too thin to be merchantable.

The present invention embodies means to overcome this objectionable characteristic of present machines and it is, therefore, an object of the present invention to provide a freezing chamber with novel means to convey "mix" delivered thereto into a region thereof remote from the discharge.

Another object is to provide a freezer of the character referred to with novel rugged means to convey "mix" directly to the back end of the freezing chamber before delivering it into said chamber.

Another object is to provide means within a freezing chamber for conveying "mix" from one end to the other end thereof, which means includes a power operated screw conveyor operating in a shielded conductor tube.

Another object is to provide a conveyor means of the kind referred to which is easy to assemble and may be disassembled quickly for easy cleaning.

Another object is to provide a novel double walled easily assembled conveyor passage within the freezing chamber.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Fig. 1 is a longitudinal vertical sectional detail view of the feeding, refrigerating and freezing mechanism of a freezer for frozen custards or the like.

Fig. 2 is an enlarged transverse sectional view taken substantially on line 2—2 of Fig. 1.

Fig. 3 is an enlarged sectional detail view taken substantially on line 3—3 of Fig. 1.

Referring to the accompanying drawing, which illustrates but a part of a complete freezer embodying the features of the present invention, the freezer mechanism and feed means are arranged in a cabinet including a front wall 11. Suitable vertically aligned openings are provided in the front wall which afford openings for the front ends, respectively, of a refrigerating chamber 12 and a freezing chamber 13. As shown, these chambers consist of horizontally disposed tubular shells closed at their rear ends and preferably flanged externally at their front ends to provide means for securing them, as by welding, to the front wall. The refrigerator chamber 12 has a refrigerant coil 14 arranged therearound which carries any suitable freezing medium supplied thereto by any conventional type of refrigerating apparatus (not shown). The freezing chamber 13 likewise has a refrigerant coil 15 arranged therearound and in connection with the refrigerating apparatus. Obviously, the difference in the number of coils surrounding the chambers 12 and 13 affords an organization wherein the chamber 12 may be maintained at low non-freezing temperatures while the chamber 13 may be maintained at or below freezing temperatures.

The "mix" may, for example, constitute a substantially liquid substance of the character to be dispensed in the form of a substantially frozen, relatively firm product. The "mix" is poured into a filling container generally indicated at 16. This container may consist of a hopper-like structure formed integrally with a ring 17 which extends rearwardly therefrom and fits snugly into the front end of the refrigerating chamber 12. In use, the filling container is kept substantially full so as to maintain a supply of mix within the chamber 12. The "mix" retained in the chamber 12 is, of course, refrigerated so as to become substantially firm without losing its fluidity.

The lower end of the filling container 16 terminates in a tubular neck 18 having a cylindrical passage 19 therethrough. The passage 19 receives, slidably therein, a valve structure generally indicated at 20. The specific valve structure is shown and claimed in a pending Woodruff application, Serial No. 52,933, filed October 5, 1948, and constitutes no part of the present invention. It is, therefore, sufficient to note that the valve 20 consists of a cylinder 21 having a closure plate 22 at its upper end and a closure plate 23 at its lower end. Circumferential slots 24 and 25 are provided in the wall of the cylinder 21 so that one or the other of said slots is located outside of the passage 19 when the valve is in various operable positions. In the position illustrated, the upper slots 24 are within the passage 19 and the lower slots 25 are in communication with a feed compartment or hopper 26 arranged beneath the filling container 16 in the manner shown.

The valve 20 is adapted to be raised at selected intervals, in a manner to be described hereinafter, so as to carry the slots 24 upwardly into communication with the filling container whereupon refrigerated "mix" contained therein may flow through the slots into the cylinders 21. When the valve is permitted to fall or drop into the position illustrated, the flow through the slots 24 is cut off and the "mix" contained in the cylinder 21 flows out of the slots 25 into the feed hopper 26. It should be apparent that each time the valve 20 is reciprocated through one operating cycle, a measured quantity of refrigerated "mix" is delivered to the feed hopper 26.

Operation of the valve 20 is accomplished automatically, as will be better understood as the description proceeds, and it accordingly is provided on the lower side of its bottom wall 23 with a depending sleeve 27 of lesser diameter than the sleeve 21. This sleeve receives therein a compression spring 28, the upper end of which bears against the bottom of the wall 23 and the lower end of which rests upon the upper end of a hollow column 29. The column 29 is formed integral with the bottom wall of the feed hopper 26 and a passage is provided therethrough to receive a slidable plunger 31 freely therein. The plunger 31 has its upper end secured in any suitable manner to the bottom wall 23 of the valve 20 and its lower end depends below the bottom of the feed hopper as shown.

The feed hopper 26 preferably is integrally formed on the front face of a plate-like member 32 which is suitably provided with a rearwardly extending circular flange 33 that fits snugly within the open end of the freezing chamber 13. The wall 32 is provided, within the area of the lowermost point of the freezing chamber 13, with a discharge spout 34. The spout 34 preferably is substantially of large diameter and it communicates at one end directly with the interior of the freezing chamber 13. Its other or discharge end is suitably machined to receive in sliding association therewith a knife gate 35 which may be of any conventional construction such, for example, as is illustrated in the aforesaid Woodruff application. Briefly, the gate 35 is pivotally mounted, as at 36, to the discharge spout 34 and it has a portion thereof extending upwardly beyond the upper periphery of the spout suitably formed on its upper edge with a rearwardly extending flange 37. The flange 37 is adapted to cooperate with a laterally projecting roller 38 carried on the lower end of the plunger 31.

In the operation of the device insofar as it has been described hereinabove, the gate 35 is adapted to be moved upwardly into an open position to permit the discharge of a desired quantity of frozen "mix" from the freezing chamber 13, after which it is returned to closed position. The novel manner in which the "mix" enters the freezing chamber 13 will receive consideration hereinafter. Each time the gate 35 is moved into open position, the flange 37 thereon is carried upwardly to thereby enable the spring 28 to urge the valve 20 into its uppermost position. While the valve is in this position, refrigerated "mix" enters the same. The capacity of the valve 20 is substantially equal to the volume of frozen "mix" discharged when the discharge gate is opened. When the gate is moved down into closed position, the flange 37 thereon engages the roller 38 and carries the rod 32 and valve 20 into their lowermost positions illustrated. As a consequence, a measured quantity of refrigerated "mix" corresponding to the amount of frozen "mix" discharged is delivered to the feed hopper 26 each time the gate is operated. This is what is commonly termed a continuous-flow mechanism.

Refrigerated "mix" delivered to the feed hopper 26 is conveyed, by novel means to be now described, into the freezing chamber 13. In the present disclosure, the refrigerated "mix" is conveyed from the front of the freezer for discharge into the rear end of the freezing chamber. This novel manner of delivering a supply of refrigerated "mix" to the freezing chamber prevents insufficiently frozen "mix" from flowing through the discharge spout 34 when the gate is opened.

Specifically, the feed hopper 26 is provided at its lower end adjacent to the wall 32 with an orifice 41. The orifice 41 communicates at its lower end with a channel 42 formed in a plug 43 firmly secured in and extending rearwardly from the wall 32. The channel 42 preferably is formed by milling the plug 43 prior to its being driven into the wall 32. The rearwardly projecting end of the plug 43 constitutes a boss on the inside face of the wall 32. Obviously, the plate or wall 32 could be formed with an integral boss in lieu of the plug 43 but it preferably is provided as a separate insert to present a bearing for a beater to be described presently. The boss is suitably turned down, as at 44, adjacent its free end to provide a diameter less than the diameter of the plug 43.

A tube 45 is telescoped loosely over the reduced diameter 44 and it may be provided with a detent 46, as best shown in Fig. 3, coincident with the channel 42 to prevent its rotation relative thereto. The other or rear end of the sleeve 45 is loosely seated in a recess 47 on the inside face of a hub 48 of a beater 49. The beater may be of any suitable construction. However, it is preferred that it include the hub 48 and a similar opposed hub 50 in axial alignment therewith. The hub 50 is loosely journalled upon the plug-boss 43. Interconnecting fingered webs 51 bridge the gap between the hubs 48 and 50, and are located in close proximity to the inside face of the cylindrical wall of the freezing chamber 13.

The beater hub 48 has a squared opening to receive the squared end 52 of a shaft 53 which may be journalled, for example, as in a bearing block 54. A pulley 55 is fixedly secured to the shaft 53 to receive trained thereover a driven belt 56. Upon operation of the belt 56, while the freezer is in use, the shaft 53 is rotated to rotate therewith the beater 49. If desired, a bushing 57 may be located between the hub 48 and the back wall 58 of the freezing chamber.

A pair of circular washers, or collars, 59 and 60 is loosely mounted on the tube 45. The collar 59 is suitably shouldered to have fitted snugly thereon a sleeve 61 of a diameter substantially greater than the diameter of the tube 45. The other end of the sleeve 61 abuts the collar 60. Upon referring to Figs. 1 and 2, it will be observed that the collar 60 has a spider formed integrally therewith and projecting into the sleeve 61. This spider preferably consists of diametrically opposed webs 62 integral at one end with the collar 60 and at their other ends with a ring 63. The ring 63 has a diameter corresponding substantially with the inside diameter of the sleeve 61 so as to fit rather snugly therein.

The tube 45 and the sleeve 61 have registering openings 64 and 65 respectively in registering alignment with the spaces between the webs 62. Accordingly, the openings in the sleeve and tube afford means whereby mix delivered into the forward end of the tube through the milled slot 42 may pass out of the tube adjacent its rear end and into the interior of the freezing chamber 13. The ring 63 prevents the flow of "mix" into the space between the tube 45 and sleeve 61.

Inasmuch as the freezing chamber 13 has a temperature sufficiently low to substantially freeze the contents thereof, the sleeve 61 affords means for insulating the tube 45 and its contents from such freezing temperatures. As a consequence, the "mix" fed through the tube 45 remains in substantially the refrigerated condition it obtained at the time of being delivered thereto. Refrigerated "mix" delivered into the rear end of the freezing chamber is co-mingled with the "mix" already therein and such freshly delivered substantially fluid "mix" is not carried into a discharge region of the freezing chamber. As a matter of fact, the refrigerated "mix" delivered into the freezing chamber is thoroughly mixed with the partially frozen mix in said chamber and only properly congealed or frozen "mix" is discharged through the discharge spout 34.

In order to facilitate the flow of refrigerated "mix" through the tube 45, suitable means is provided, preferably in the form of a feed screw 66. As shown, the screw 66 extends through the tube 45 and has its rearmost end engaged in a slot 67 provided in the end of the squared drive-shaft portion 52.

The entire assembly described hereinabove is easily and quickly assembled and disassembled for purposes of cleaning. When the apparatus assembled in the manner illustrated in Fig. 1 is to be disassembled for cleaning, the filling container 16 and feed hopper plate 32 are removed from the front of the cabinet. The beater 49, including the tube and sleeve assembly, then is withdrawn through the open front end of the freezing chamber 13. This sub-assembly may be disassembled by withdrawing the tube 45 from the beater whereupon the sleeve 61 and collars 59 and 60 are readily separated. The feed screw 66 likewise is easily and quickly disassociated with the squared drive-shaft portion 52. To reassemble, the parts are replaced in substantially the reverse chronological order.

Although an exemplary form of construction and assembly has been shown in the accompanying drawing and described in detail hereinabove, it should be understood that the feed mechanism may embody a wide variety of modifications in detail construction and that the feed assembly may be incorporated in freezers embodying structural details differing from those illustrated by way of an example without departing from the spirit of the invention or the scope of the appended claims.

I claim:

1. In a machine for dispensing frozen custards or the like, a closure for the open end of a freezing chamber comprising a plate, a receptacle on one face of said plate, a tube projecting from the other face of and perpendicular to the plate so as to extend into the chamber when the plate is mounted thereon, said tube being in communication with the receptacle and having a discharge opening at its free end, and a shell surrounding the tube to prevent congealing of "mix" fed through the tube from the receptacle for discharge into the chamber.

2. In a machine for dispensing frozen custards or the like, a freezing chamber open at its front end, a closure for said end, a boss on the inside face of the closure, said boss having an opening in its free end communicating with the outside of the closure to provide a passage for "mix" to be frozen, a tube having one end fitted over said boss and extending rearwardly into the freezing chamber, said tube being open at its rear end so as to deliver "mix" to the rear end of the chamber, and a discharge outlet in the closure.

3. In a machine of the character recited in claim 2, in which a sleeve surrounds the tube to prevent freezing of "mix" therein.

4. In a machine for dispensing frozen custards and the like, a horizontally disposed freezing chamber closed at one end, said chamber being adapted to receive a continuous supply of "mix" to be frozen therein, a closure for the open end of said chamber, a boss on the inside face of the closure, said boss having an opening therethrough communicating with the exterior of the freezing chamber, a driven shaft extending through the closed chamber end in coaxial alignment with the boss, a beater journalled at one end on said boss and having a drive fit with said shaft, a tube supported at one end on the boss and having its other end seated in the beater, spacer rings mounted on said tube, a sleeve surrounding the tube and supported at its ends by said rings, said tube and sleeve having openings adjacent the closed end of the chamber of such character that "mix" entering the tube through the opening in the boss is delivered into the closed end of the chamber, and a "frozen mix" discharge in the closure.

5. In a machine of the character recited in claim 4, in which means is associated with the discharge outlet to regulate the flow of "mix" to the freezing chamber.

6. In a machine of the character recited in claim 4, in which means is associated with the discharge outlet to regulate the flow of "mix" to the freezing chamber and means is provided to open the valve each time the outlet is opened.

7. In a machine for dispensing frozen custards or the like, a closure for the open end of a freezing chamber comprising a plate, a receptacle on one face of said plate, a tube projecting from the other face of and perpendicular to the plate so as to extend into the chamber when the plate is mounted thereon, said tube being in communication with the receptacle and having a discharge opening at its free end, and a screw conveyor arranged in said tube.

8. In a machine for dispensing frozen custards or the like, a freezing chamber open at its front end, a closure for said end, said closure having an opening communicating outside of the freezing chamber with a source of supply for "mix"

to be frozen, a tube surrounding the inner end of the opening and extending rearwardly into the freezing chamber, a sleeve surrounding the tube to prevent freezing of "mix" therein, said tube being open at its rear so as to deliver "mix" to the back end of the chamber, and a discharge outlet in the closure.

9. In a machine of the character recited in claim 8, in which the sleeve has openings through which "mix" leaving the tube may pass.

10. In a machine of the character recited in claim 8, in which the sleeve has openings through which "mix" leaving the tube may pass and a spider reinforces the sleeve in the area of said openings.

11. In a machine for dispensing frozen custards or the like, a freezing chamber open at its front end, a closure for said end, said closure having an opening communicating outside of the freezing chamber with a source of supply for "mix" to be frozen, a tube surrounding the inner end of the opening and extending rearwardly into the freezing chamber, a driven conveyor operating in said tube, said tube being open at its rear end so as to deliver "mix" to the back end of the chamber, and a discharge outlet in the closure.

LEO S. MARANZ.

REFERENCES CITED

The following references are of record in the file of this patent:

UNITED STATES PATENTS

| Number | Name | Date |
|---|---|---|
| 797,512 | Glauser | Aug. 15, 1905 |
| 970,369 | Greaves | Sept. 13, 1910 |
| 1,951,365 | Morrow | Mar. 20, 1934 |
| 2,083,072 | Lindsey | June 8, 1937 |